United States Patent
Oaki et al.

(10) Patent No.: US 7,539,350 B2
(45) Date of Patent: May 26, 2009

(54) IMAGE CORRECTION METHOD

(75) Inventors: Junji Oaki, Kanagawa (JP); Shinji Sugihara, Tokyo (JP); Yuichi Nakatani, Kanagawa (JP)

(73) Assignee: Advanced Mask Inspection Technology Inc., Yokohama-shi (JP)

( * ) Notice: Subject to any disclaimer, the term of this patent is extended or adjusted under 35 U.S.C. 154(b) by 700 days.

(21) Appl. No.: 11/360,584

(22) Filed: Feb. 24, 2006

(65) Prior Publication Data

US 2006/0215900 A1  Sep. 28, 2006

(30) Foreign Application Priority Data

Mar. 24, 2005  (JP)  .............................. 2005-085214

(51) Int. Cl.
    *G06K 9/40* (2006.01)
(52) U.S. Cl. .................................... 382/254
(58) Field of Classification Search ............. 348/394.1, 348/409.1, FOR. 110; 382/254, 283; 703/4, 703/FOR. 802
    See application file for complete search history.

(56) References Cited

U.S. PATENT DOCUMENTS

| | | | |
|---|---|---|---|
| 5,866,895 A | * | 2/1999 | Fukuda et al. ............... 235/494 |
| 2006/0018530 A1 | | 1/2006 | Oaki et al. |
| 2006/0215900 A1 | | 9/2006 | Oaki et al. |

FOREIGN PATENT DOCUMENTS

| | | |
|---|---|---|
| JP | 08-076359 | 3/1996 |
| JP | 10-096613 | 4/1998 |
| JP | 10-155139 | 6/1998 |
| JP | 2000-105832 | 4/2000 |
| JP | 2000-241136 | 9/2000 |
| JP | 2000-348177 | 12/2000 |
| JP | 2003-287419 | 10/2003 |
| JP | 2006-030518 | 2/2006 |

OTHER PUBLICATIONS

U.S. Appl. No. 11/567,550, filed Dec. 6, 2006, Oaki.
U.S. Appl. No. 11/567,520, filed Dec. 6, 2006, Oaki.
U.S. Appl. No. 11/360,584, filed Feb. 24, 2006, Oaki, et al.
U.S. Appl. No. 11/386,744, filed Mar. 23, 2006, Sugihara, et al.

* cited by examiner

*Primary Examiner*—Matthew C Bella
*Assistant Examiner*—Gregory F Cunningham
(74) *Attorney, Agent, or Firm*—Oblon, Spivak, McClelland, Maier & Neustadt, P.C.

(57) ABSTRACT

An image correction method having a small number of setting parameters achieved by integrating shift (alignment) in unit of a sub-pixel and image correction. A relationship between an inspection reference pattern image and a pattern image under test is identified, a mathematical expression model which fits a pixel error, expansion and contraction/distortion noise, and sensing noise of the image is constructed, and the model is simulated to generate an estimation model image.

7 Claims, 7 Drawing Sheets

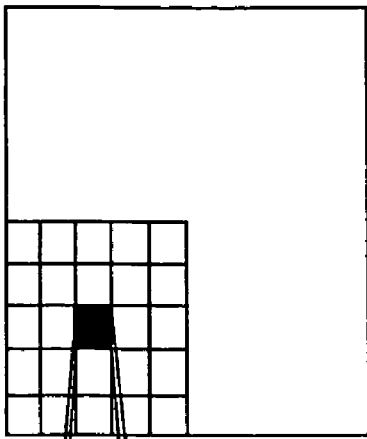
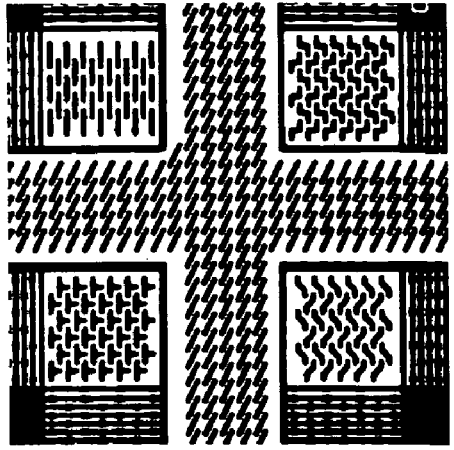
Fig. 1A
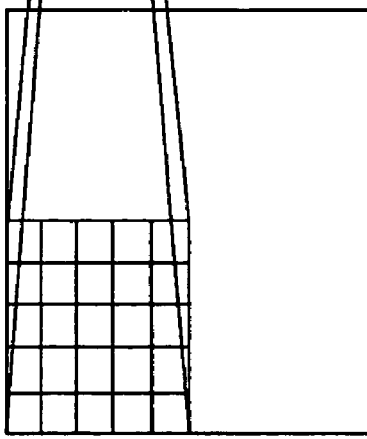
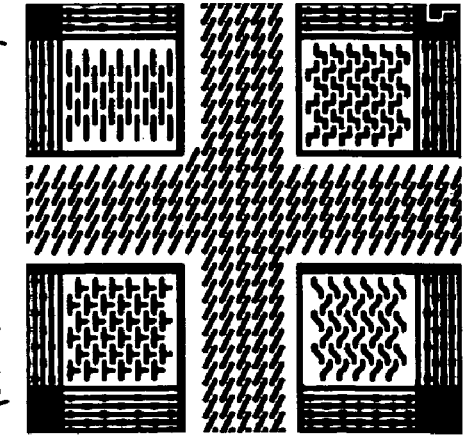
Fig. 1B

IMAGE CORRECTION METHOD

CROSS-REFERENCE TO RELATED APPLICATION

This application is based upon and claims the benefit of priority from prior Japanese Patent Application No. 2005-085214 filed on Mar. 24, 2005 in Japan, the entire contents of which are incorporated herein by reference.

BACKGROUND OF THE INVENTION

1. Field of the Invention

The present invention relates to an image correction method. The image correction method can be used in, for example, a pattern inspection apparatus for inspecting the presence/absence of a defect of a micropattern image formed on a workpiece being tested such as reticle used in, for example, manufacturing of an LSI.

2. Description of the Related Art

In general, since a lot of cost is required to manufacture an LSI, an increase in yield is inevitable. As one factor which decreases a yield, a pattern defect of a reticle used when a micropatterning image is exposed and transferred on a semiconductor wafer by a lithography technique is known. In recent years, with a miniaturization of LSI pattern size, the minimum size of a defect to be detected is also miniaturized. For this reason, a higher precision of a pattern inspection apparatus for inspecting a defect of a reticle is required.

Methods of inspecting the presence/absence of a pattern defect are roughly classified into a method of comparing a die with a die (Die-to-Die comparison) and a method of comparing A die with a database (Die-to-Database comparison). The Die-to-Die comparison (DD comparison) is a method of comparing two dies on a reticle to detect a defect. The Die-to-Database comparison (DB comparison) is a method of comparing a die and a database generated from CAD data for LSI design to detect a defect.

With micropatterning on a reticle, defects such as a pixel positioning error between images to be compared with each other, expansion and contraction and distortion of an image, defects which are small enough to be buried in sensing noise, must be detected. Even in the DD comparison or the DB comparison, alignment and image correction in a sub-pixel unit is very important in a pre-stage in which comparison and inspection of an inspection reference pattern image and a pattern image under test.

Therefore, in the conventional pre-stage in which two images, i.e., an inspection reference pattern image and a pattern image under test are inspected by comparison, after alignment in units of sub-pixels based on bicubic interpolation is performed, a correction of expansion and contraction of an image(see, for example, Japanese Patent Application Laid-Open No. 2000-241136), a distortion correction of an image, a resizing correction, a noise averaging process, and the like are sequentially performed. However, a repetition of these corrections generates an accumulative error and serves as a main factor of deteriorating an image. Furthermore, setting of appropriate values a large number of parameters require for the respective corrections and setting of an appropriate order of the respective corrections are disadvantageously difficult.

BRIEF SUMMARY OF THE INVENTION

The present invention has been made in consideration of the above circumstances, and has as its object to provide an effective image correction method which integrates alignment and image correction, causes less image deterioration, and requires a small number of setting parameters.

An image correction method according to an embodiment of the present invention is a method of comparing an inspection reference pattern image and a pattern image under test with each other, including: the decomposed image generating step of setting reference points at a plurality of separated positions of the inspection reference pattern image, giving a weight to the inspection reference pattern image with reference to the reference points, and generating decomposed images the number of which is equal to the number of reference points; the simultaneous equation generating step of generating simultaneous equations which describe an input-output relationship using a linear prediction model using, as an output, respective pixels of the pattern image under test and using, as an input, a linear coupling of a pixel group around a pixel corresponding to each pixel of the decomposed images the number of which is equal to the number of reference points; the simultaneous equation solving step of solving the simultaneous equations to estimate parameters of the prediction model; and the estimation model image generating step of generating an estimation model image by using the estimated parameters.

In the image correction method, the linear prediction model is a two-dimensional prediction model using each pixel of the pattern under test as two-dimensional output data and using a linear coupling of a pixel group around each pixel as two-dimensional input data.

In the image correction method, the simultaneous equation solving step estimates the parameters of the prediction model by using the least-square method.

In the image correction method, the reference points are the apexes of the inspection reference pattern or points therearound.

In the image correction method, the pixel group around the corresponding pixel are a pixel group in a 5×5 matrix centered on the corresponding pixel.

In the image correction method, the linear coupling is performed by linear interpolation with respect to decomposed images the number of which is equal to the number of reference points.

In the image correction method, the image dividing step of dividing the inspection reference pattern image and the pattern image under test into plurality of regions, respectively, is performed before the decomposed image generating step, and parameters of the prediction model are estimated with respect to the divided images to generate an estimation model image.

BRIEF DESCRIPTION OF THE FIGURES OF THE DRAWING

FIGS. 1A and 1B are schematic views of a two-dimensional linear prediction model used in a pattern image inspection method;

DETAILED DESCRIPTION OF THE INVENTION

A pattern inspection method according to an embodiment of the present invention will be described below with reference to the drawings.

(Outline of Pattern Inspection Method)

Figure 2:
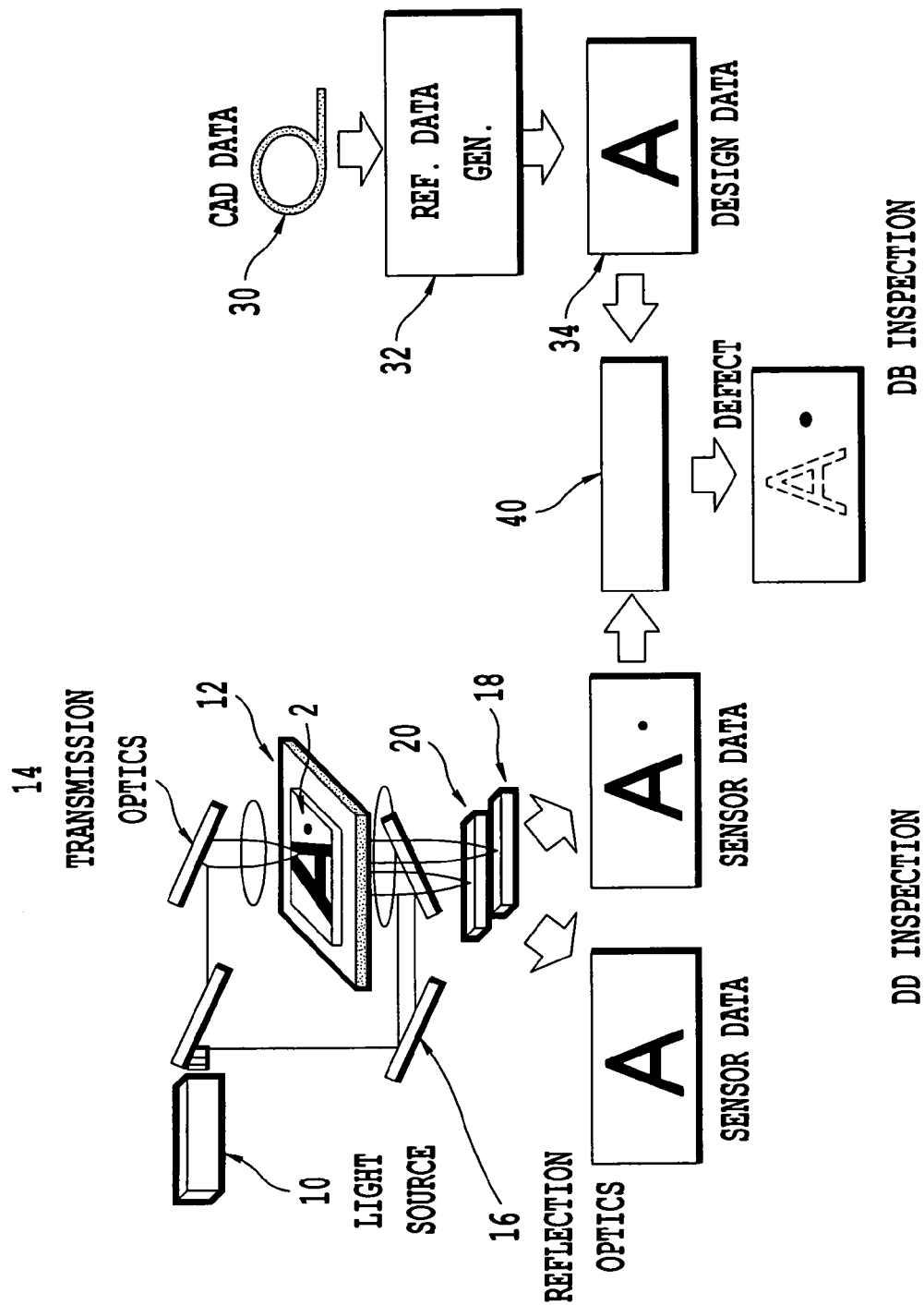
FIG. 2 is a diagram showing the configuration of a concrete example of a pattern inspection apparatus.

A pattern inspection method is performed by using a pattern inspection apparatus. The pattern inspection apparatus is operated by using an irradiating unit for irradiating light on a workpiece being tested and an image acquiring unit for detecting reflected light or transmitted light from the workpiece being tested to acquire a pattern image. A configuration of one concrete example of the pattern inspection apparatus is shown in FIG. 2. A reticle will be described as the workpiece being tested. However, as the workpiece being tested, any workpiece on which a pattern is formed may be used. A mask, a wafer, and the like may be used. The pattern inspection apparatus includes: a light source 10 for generating light; a stage 12 on which a reticle 2 is placed; a stage drive system for driving the stage (not shown); a transmission optics (a transmissive optical system) 14 designed to cause light from the light source 10 to transmit the reticle 2 placed on the stage 12; a reflection optics 16 for irradiating the light from the light source 10 on the reticle 2 placed on the stage 12 to make it possible to detect the reflected light; a transmitted light sensor 18 for detecting transmitted light obtained from the transmission optics 14; and a reflected light sensor 20 for detecting the reflected light from the reflection optics 16. The transmission optics 14 and the reflection optics 16 are constituted by, e.g., a half mirror and a convex lens, respectively. The light irradiating unit includes at least one of the light source 10, the transmission optics 14, and the reflection optics 16. The image acquiring unit includes at least one of the transmitted light sensor 18 and the reflected light sensor 20.

Figure 3:
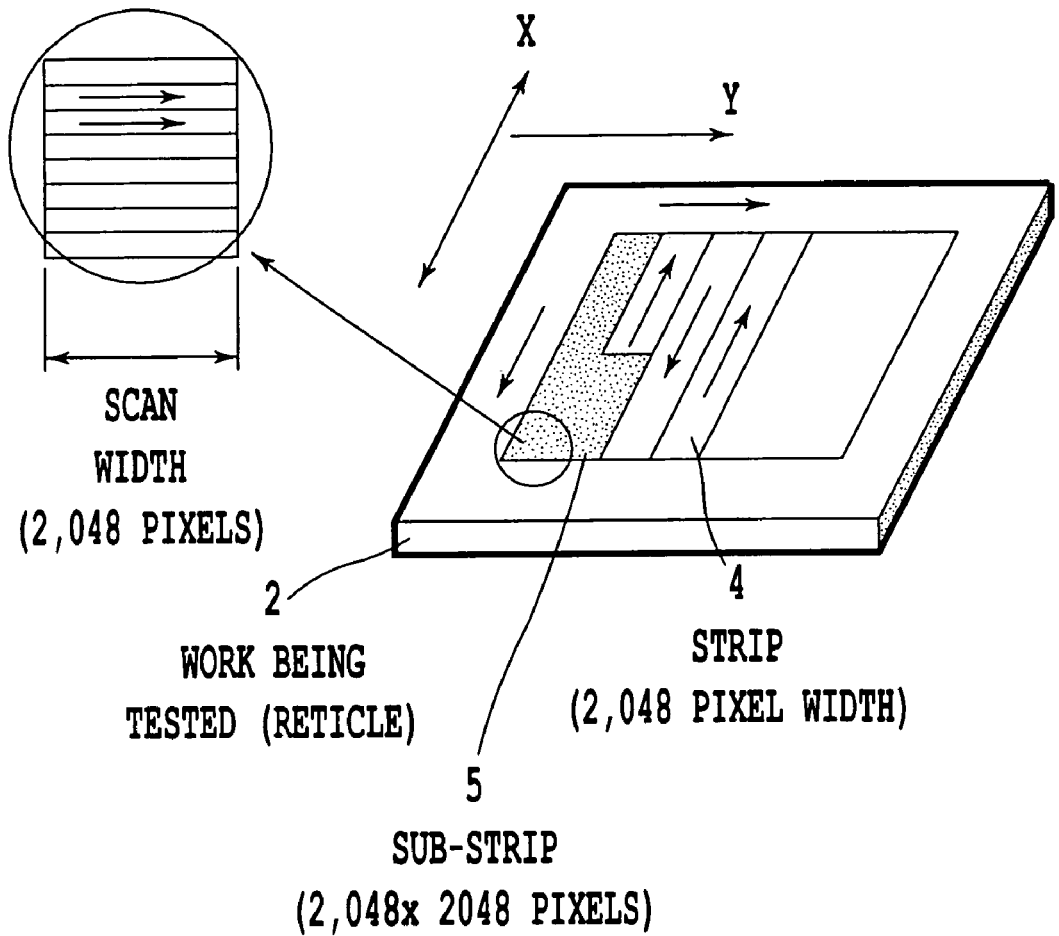
FIG. 3 is a diagram for explaining image acquisition by mask scanning of a line sensor.

Detailed acquisition of a pattern image drawn on the reticle 2 is performed by scanning the reticle 2 with a line sensor as shown in FIG. 3. In this case, for descriptive convenience, a unit of a strip 4 obtained by cutting the reticle 2 in strips in an X-axis direction shown in FIG. 3 (direction of one side of the reticle 2) is called one strip. A square image 5 obtained by finely cut one strip in a Y-axis direction (direction perpendicular to the X-axis direction) is called one sub-strip. One sub-strip, for example, is defined as 2048×2048 pixels. Inspection of the presence/absence of a defect is performed for every sub-strip. It is assumed that one pixel has 256 grayscales.

The pattern inspection method is performed by comparing pattern images with each other as shown in FIG. 2. As the comparison, comparison between a die and a die or comparison between a die and a database is known. In a die-to-die comparison (DD comparison) method, sensor data, recorded by the transmitted light sensor 18 or the reflected light sensor 20 using at least one of transmitted light and reflected light, of two dies on the reticle 2 are compared with each other by a comparator 40. In this manner, a defect is detected. In a die-to-database comparison (DB comparison) method, a sensor data, recorded by the transmitted light sensor 18 or the reflected light sensor 20 using at least one of transmitted light and reflected light on one die on the reticle 2 and design data 34 generated from a reference data generator circuit 32 based on CAD data 30 for designing an LSI are compared with each other by the comparator 40. In this manner, a defect is detected.

The pattern inspection method used in the embodiment is to break through the limit of a direct comparison method. In the pattern inspection method, as shown in FIG. 1B, during inspection of a relationship between an inspection reference pattern image and a pattern image under test (an under-test pattern image), the image under test is identified online by using a linear prediction model, e.g., a two-dimensional linear prediction model to construct a prediction model which fits a pixel positional error, expansion/contraction noise, or sensing noise. An estimation model image is generated from the prediction model. The estimation model image and the pattern image under test are compared with each other. Based on the comparison result, a defect on the pattern image under test is detected.

(Setting of Two-Dimensional Linear Prediction Model (Simultaneous Equation Generating Step))

First, a method of setting a two-dimensional prediction model (two-dimensional input/output linear prediction model) by regarding an inspection reference pattern image as two-dimensional input data and regarding a pattern image under test as two-dimensional output data will be described below. In this case, a 5×5 two-dimensional linear prediction model using a 5×5-pixel region will be exemplified. A suffix (corresponding to a position of 5×5 pixels) used in the model is shown in Table 1. In FIG. 1, the left images are defined as inspection reference patterns, and the right images are defined as images under test. The two-dimensional linear prediction model is a linear prediction model when input and output data are handled as two-dimensional data.

TABLE 1

|   | 0 | 1 | 2 | 3 | 4 |
|---|---|---|---|---|---|
| 0 | i−2, j−2 | i−2, j−1 | i−2, j | i−2, j+1 | i−2, j+2 |
| 1 | i−1, j−2 | i−1, j−1 | i−1, j | i−1, j+1 | i−1, j+2 |
| 2 | i, j−2 | i, j−1 | i, j | i, j+1 | i, j+2 |
| 3 | i+1, j−2 | i+1, j−1 | i+1, j | i+1, j+1 | i+1, j+2 |
| 4 | i+2, j−2 | i+2, j−1 | i+2, j | i+2, j+1 | i+2, j+2 |

The two-dimensional input data and the two-dimensional output data are defined as u(i,j) and y(i,j). Suffixes of an interested pixel are represented by i and j. Suffixes of total of 25 pixels on about two rows and about two columns surrounding the pixel are set as in Table 1. With respect to pixel data of one pair of 5×5 regions, a relational expression as shown in Equation (1) is set. Coefficients $b_{00}$ to $b_{44}$ of input data u(i,j) of Equation (1) are model parameters to be identified.

$$\begin{aligned}
y_k &= y(i, j) \\
&= b_{00}u(i-2, j-2) + b_{01}u(i-2, j-1) + b_{02}u(i-2, j) + \\
&\quad b_{03}u(i-2, j+1) + b_{04}u(i-2, j+2) + \\
&\quad b_{10}u(i-1, j-2) + b_{11}u(i-1, j-1) + b_{12}u(i-1, j) + \\
&\quad b_{13}u(i-1, j+1) + b_{14}u(i-1, j+2) + \\
&\quad b_{20}u(i, j-2) + b_{21}u(i, j-1) + b_{22}u(i, j) + b_{23}u(i, j+1) + \\
&\quad b_{24}u(i, j+2) + \\
&\quad b_{30}u(i+1, j-2) + b_{31}u(i+1, j-1) + b_{32}u(i+1, j) + \\
&\quad b_{33}u(i+1, j+1) + b_{34}u(i+1, j+2) + \\
&\quad b_{40}u(i+2, j-2) + b_{41}u(i+2, j-1) + b_{42}u(i+2, j) + \\
&\quad b_{43}u(i+2, j+1) + b_{44}u(i+2, j+2) + \\
&\quad \varepsilon(i, j)
\end{aligned} \quad (1)$$

Equation (1) means that data $y_k=y(i,j)$ of a certain pixel of a pattern image under test can be expressed by a linear coupling of data of 5×5 pixels surrounding one pixel of the corresponding inspection reference pattern image (see FIG. 1A). In this case, the statistical characteristics of a residual E in Equation (1) are not apparent, and a parameter identification result obtained by the least-square method, to be described later, may have a bias. However, in the embodiment of the present invention, the fitting itself of input/output data obtained by Equation 1 is significant, and the value of the parameter is not directly used. For this reason, the residual $\epsilon$ does not cause any trouble.

(Simultaneous Equation Solving Step (Identification of Model Parameter))

When Equation (1) is expressed by a vector, Equation (2) is obtained. In this equation, an unknown parameter $\alpha$ is given by $\alpha=[b_{00}, b_{01}, \ldots, b_{44}]^T$, and data vector $x_k$ is given by $x_k=[u(i-2, j-2), u(i-2, j-1), \ldots, u(i+2, j+2)]^T$.

$$x_k^T \alpha = y_k \qquad (2)$$

Coordinates i and j of the inspection reference pattern image and a pattern image under test are scanned to fetch data of pixels of the coordinates i and j, and 25 sets of data are simultaneously established, a model parameter can be identified. In fact, from a statistical viewpoint, as shown in Equation (3), n (>25) sets of data are prepared, and 25-dimensional simultaneous equations are solved based on the least-square method to identify $\alpha$. In this case, $A=[x_1, x_2, \ldots, x_n]^T$, $y=[y_1, y_2, \ldots, y_n]^T$, $x_k^T \alpha = y_k$, and $k=1, 2, \ldots, n$. As a solution of these equations, in addition to the least-square method, a maximum likelihood estimation method or the like is known. Any method may be used.

$$\begin{bmatrix} x_1^T \\ \vdots \\ x_n^T \end{bmatrix} \alpha = \begin{bmatrix} y_1 \\ \vdots \\ y_n \end{bmatrix} \Rightarrow A\alpha = y \Rightarrow \alpha = (A^T A)^{-1} A^T y \qquad (3)$$

For example, when each of the inspection reference pattern image and the pattern image under test are constituted by 512×512 pixels, two pixels around each of the images are reduced. For this reason, the number of equations is given by the equations the number of which is statistically sufficient can be secured.

$$n=(512-4)\times(512-4)=258064 \qquad (4)$$

(Generation of Model Image)

An identified model parameter a and the input/output image data used in identification are assigned to Equation (1), and a simulation operation for scanning the coordinates i and j of the pixels is performed to generate an estimation model image. This estimation model image is a targeted correction image. In the estimation model image, as a result of fitting based on the least-square method, reductions of a pixel positional error smaller than one pixel, expansion and contraction, distortion noise, a resizing process, and sensing noise can be realized. In this case, as a matter of course, data used in the simulation includes a defective pixel. However, since the number of defective pixels is considerably smaller than the number of data, the defective pixels are not fitted by the least-square method, and do not appear in the estimation model image. In addition, since a peripheral S/N ratio is improved, a defective pixel is advantageously emphasized.

(Weighted Decomposition of Image)

When a variation (expansion and contraction, distortion, or the like) in an image (for example, 512×512 pixels) is large, the image may not be sufficiently expressed by a 5×5-order linear prediction model. Therefore, in order to expand an expression of the prediction model, an image is decomposed into a plurality of images. First, reference points are set at separated pixel positions in the image, and 5×5-order linear prediction models are set at the reference points, respectively. The pixels of the image are expressed by linear interpolation of prediction models the number of which is equal to the number of reference points. The reference points are preferably set at a peripheral portion where a difference of variation of the image is large. The reference points are, for example, set at four apexes (points A, B, C, and D).

Figure 4:
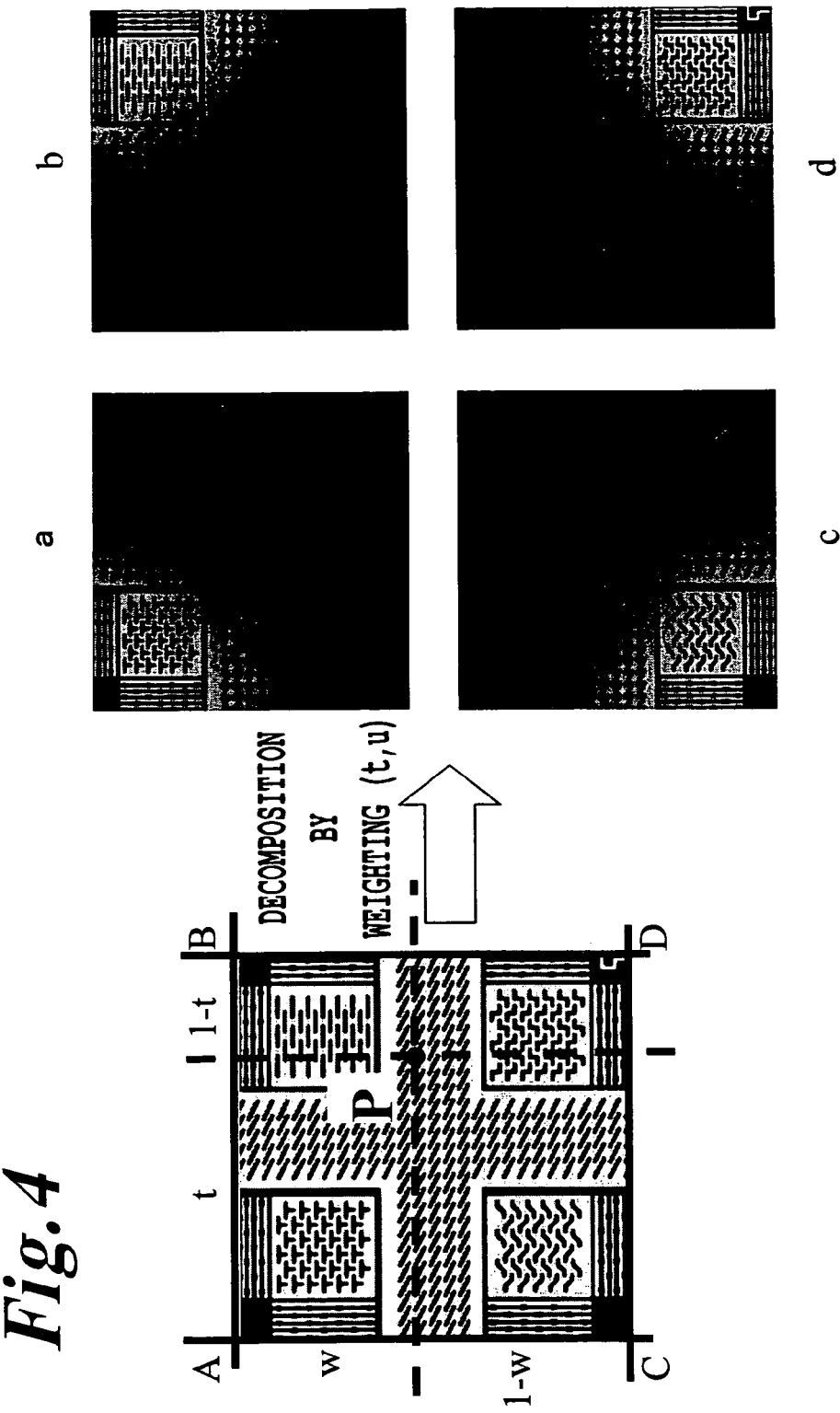
FIG. 4 is a conceptual diagram showing a principle of generating four images by weighted decomposition of one image.

The 5×5-order linear prediction models are set at the apexes of the image, respectively, and pixels in the image are expressed by linear interpolation of four prediction models. In FIG. 4, an inspection reference pattern image is decomposed into four images (a, b, c, and d) weighted at the apexes (points A, B, C, and D), and one pixel of a corresponding pattern image under test may be expressed by linear coupling of 5×5 pixels near each pixel P of each decomposed image. The pixel P is expressed by a function of linear interpolation parameters t and w in the image as expressed by Equation (5).

$$P=(1-t)(1-w)\cdot a+t(1-w)\cdot b+(1-t)w\cdot c+tw\cdot d \qquad (5)$$

The number of terms in the right side member in Equation (5), i.e., the number of parameters to be identified is given by 5×5×4=100. For this reason, 100-dimensional simultaneous equations may be solved by the same procedure as that of Equation (1). In fact, from a statistical viewpoint, as in Equation (3), parameters to be identified are calculated based on the least-square method.

(Comparison of Image Correction Result)

Figure 5:
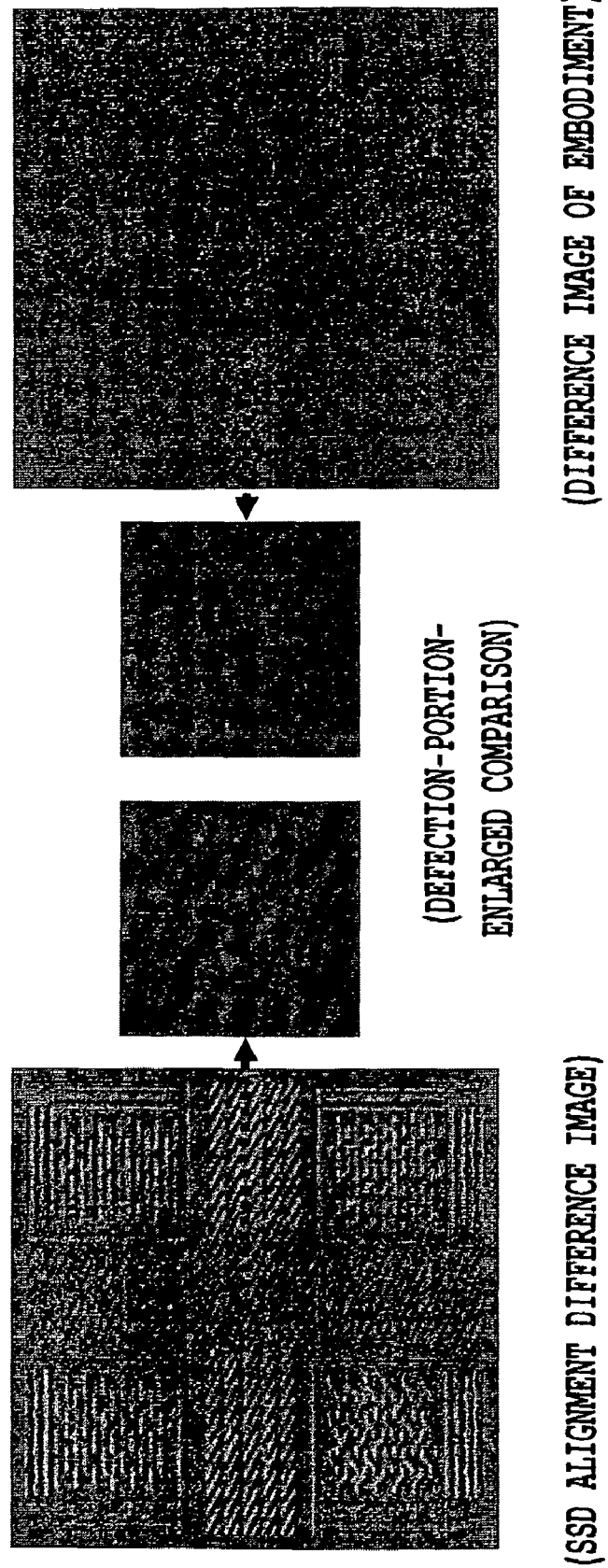
FIGS. 5A and 5B are diagrams showing comparison between image correction results obtained by an embodiment of the present invention and a conventional method.

FIG. 5 shows comparison between a difference image (FIG. 5B) obtained by the correcting method according to the embodiment and a difference image obtained by a conventional method (only alignment in unit of a sub-pixel based on bicubic interpolation). In this case, the difference image is obtained by replacing the inspection reference pattern image with an estimation model image to remove a difference between the inspection reference pattern image and the pattern image under test. In the embodiment, advantages of sub-pixel alignment, expansion and contraction/distortion correction, and resizing correction are apparent, and an S/N ratio is increased, so that a defective portion is emphasized. In a defective-portion-enlarged view at the center in FIG. 5, the number of image pattern images at a portion except for the defective portion decreases in number in the difference image of the embodiment, and the defective portion can be easily detected.

In the conventional method, expansion and contraction/distortion correction, resizing correction, or the like is performed, so that a difference image may be improved. However, repeated correction generates an accumulative error and serves as a large factor that deteriorates an image. In addition, setting of appropriate values of large number of parameters required for the corrections and setting of an appropriate order of the corrections are difficult.

(Image Division)

Figure 6:
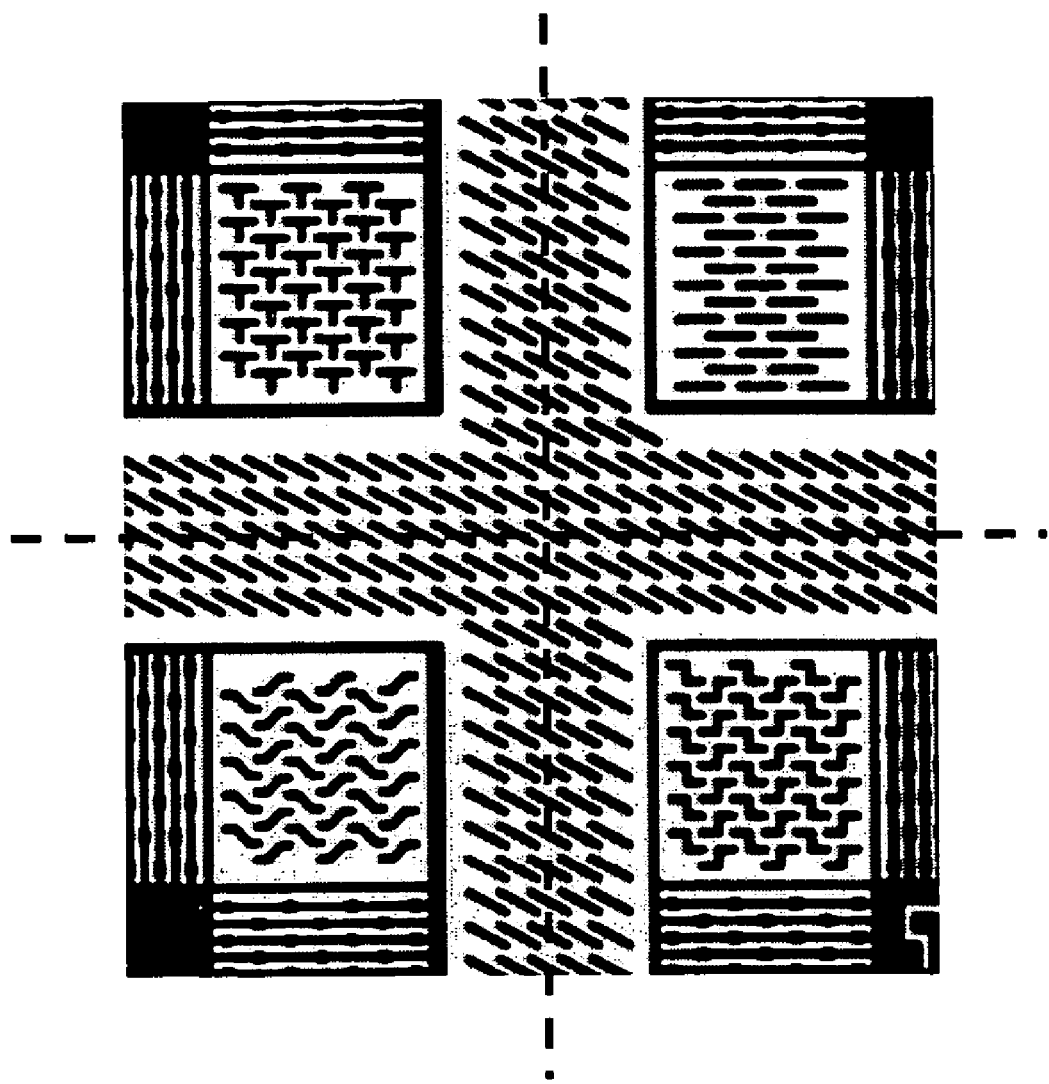
FIG. 6 is a diagram showing a decomposition example (in this case, division into four, i.e., 2×2) of one image.

In the above explanation, parameters are set in one entire image. However, as shown in FIG. 6, one image can be divided into a plurality of images (in this example, the image is divided by four), image weighting decomposition is performed in each region to set a model, and parameters may be identified. In this manner, when the image is divided, an estimation model image corresponding to a larger variation in an image can be obtained.

(Procedure of Pattern Inspection Method)

Figure 7:
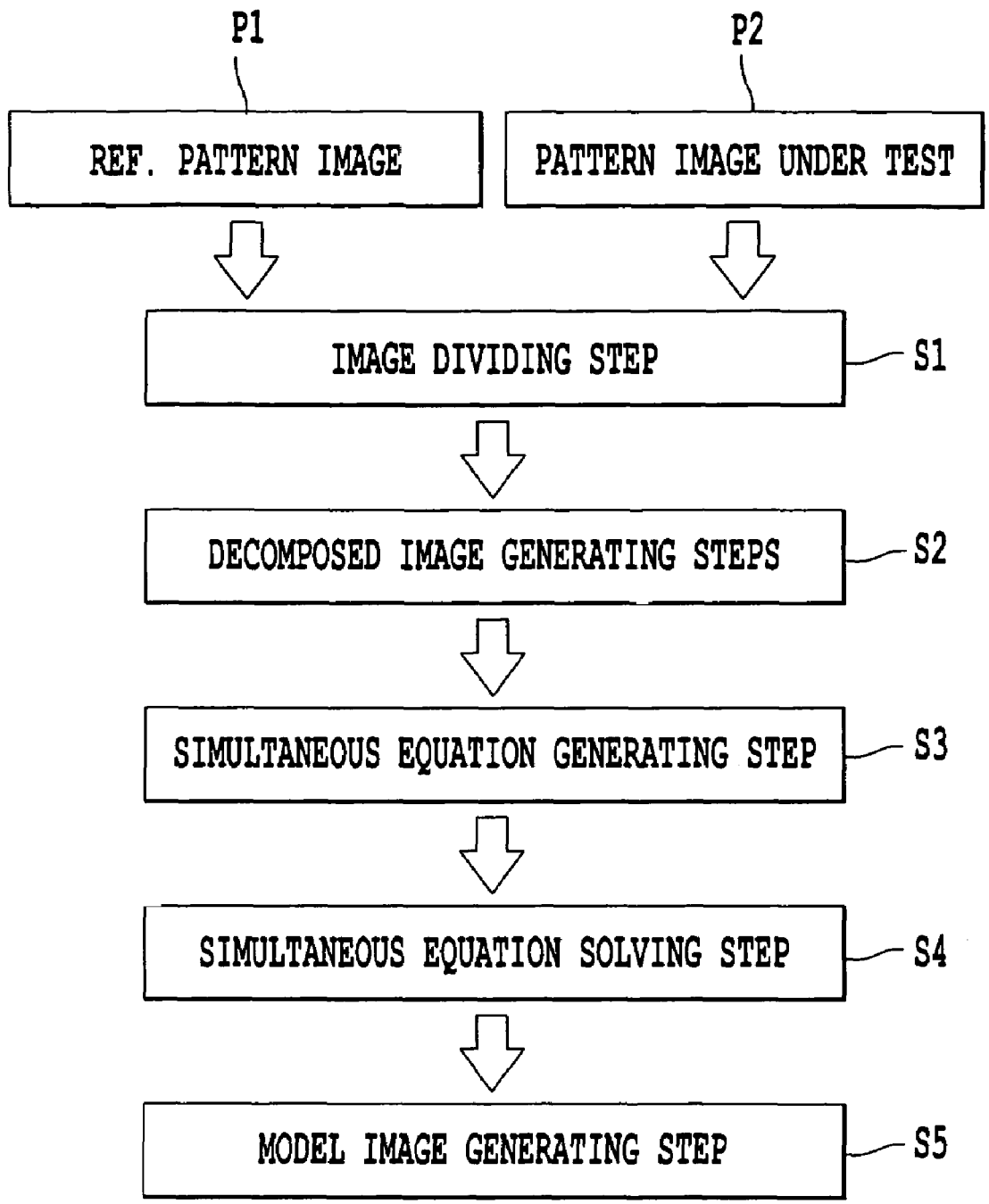
FIG. 7 is a flow chart of an image correction method.

FIG. 7 shows a procedure of the pattern inspection method. An inspection reference pattern image (P1) and a pattern image under test (P2) are divided into a plurality of images as shown in FIG. 6 (image dividing step S1). Decomposed images are generated for each divided image as shown in FIG. 4 (decomposed image generating step S2). Simultaneous equations are generated from the decomposed images as expressed by Equation (5) (simultaneous equation generating step S3). The generated simultaneous equations are solved (simultaneous equation solving step S4). By using the calculated parameters, an estimation model image (correction image) is generated (model image generating step S5). As described above, according to the embodiment, an effective image correction method achieved by integrating alignment and image correction and having less image deterioration and a small number of setting parameters. A difference image between the estimation model image generated as described above and the pattern image under test is created, and these image patterns are compared with each other, so that a defective portion of the image can be easily detected.

In addition to the above embodiment, various combinations can be considered, and other methods may be applied to setting of a model and a solution of the least-square method. For this reason, the present invention is not limited to the embodiment described above, as a matter of course.

What is claimed is:

1. An image correction method for generating an estimation model image from an inspection reference pattern image and a pattern image under test, said method comprising:

setting reference points at a plurality of separated positions of the inspection reference pattern image, giving weights to the inspection reference pattern image with reference to the reference points, and generating decomposed images the number of which is equal to the number of reference points;

generating simultaneous equations which describe an input-output relationship using a linear prediction model using, as an output, respective pixels of the pattern image under test and using, as an input, a linear coupling of a pixel group around pixel corresponding to each pixel of the decomposed images the number of which is equal to the number of reference points;

solving the simultaneous equations to estimate parameters of the prediction model; and generating an estimation model image by using the estimated parameters.

2. The image correction method according to claim 1, wherein the linear prediction model is a two-dimensional prediction model using each pixel of the pattern image under test as two-dimensional output data and using a linear coupling of a pixel group around each pixel as two-dimensional input data.

3. The image correction method according to claim 1, wherein the parameters of the prediction model are estimated by using the least-square method.

4. The image correction method according to claim 1, wherein the reference points are apexes of the inspection reference pattern image or point near the apexes.

5. The image correction method according to claim 1, wherein the pixel group around the corresponding pixel is a pixel group of a 5×5 matrix arranged around the corresponding pixel.

6. The image correction method according to claim 1, wherein the linear coupling is performed by linear interpolation with respect to decomposed images the number of which is equal to the number of reference points.

7. The image correction method according to claim 1, comprising dividing the inspection reference pattern image and the pattern image under test into plurality of regions, respectively, before the decomposed image generating step, and wherein parameters of the prediction model are estimated with respect to the divided images to generate an estimation model image.

* * * * *